July 5, 1966  K. A. BOYD  3,259,219
VISCOUS COUPLING
Filed Oct. 14, 1963
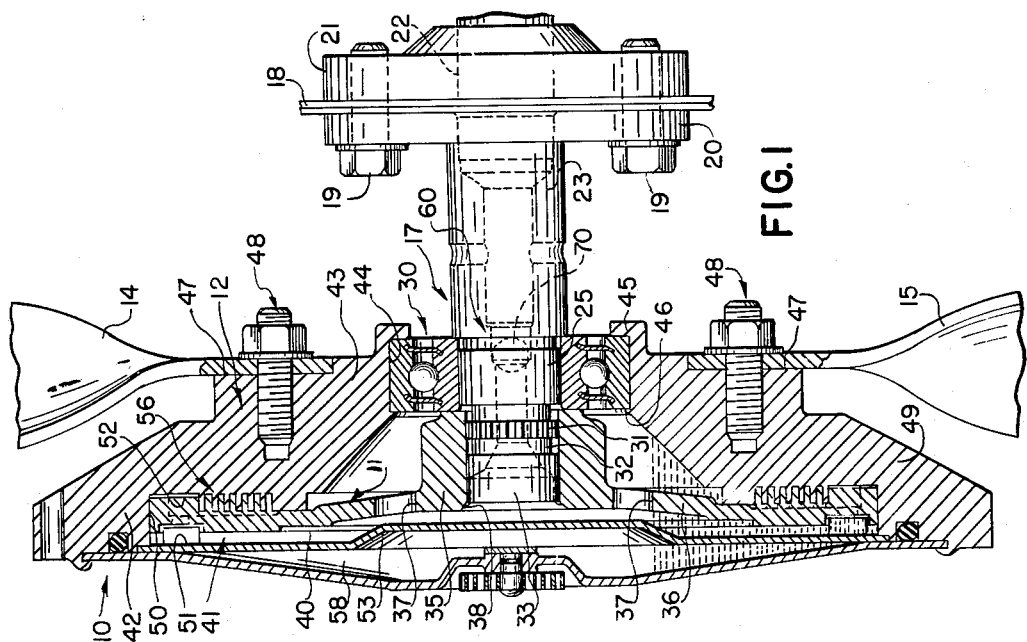
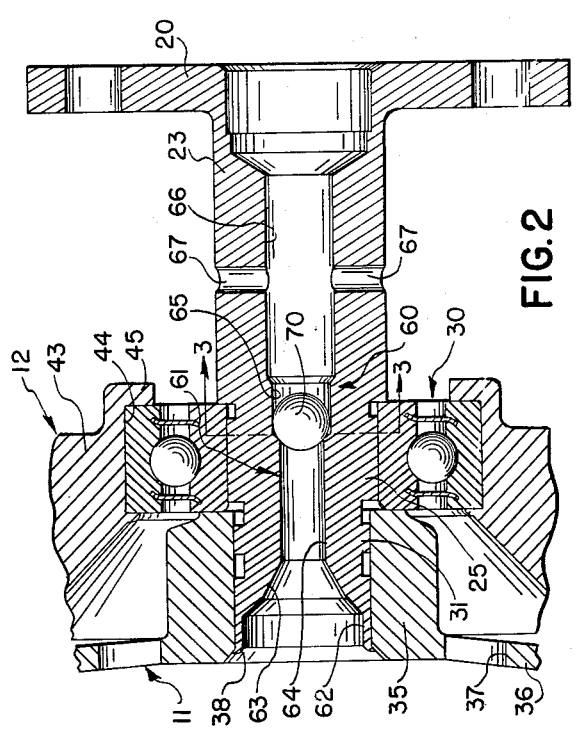
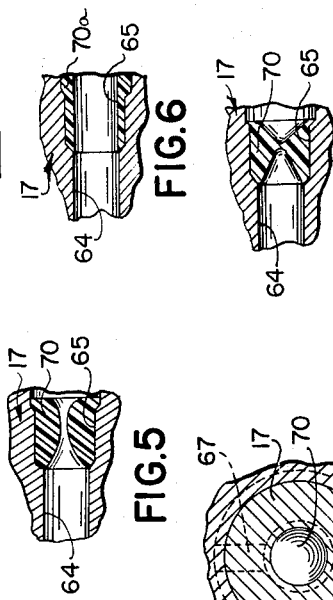
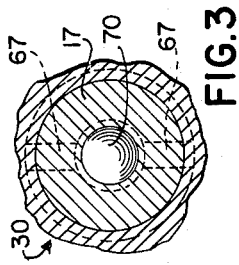
INVENTOR.
KEITH A. BOYD
BY Williams, David,
Hoffmann & Yount
ATTORNEYS

United States Patent Office 3,259,219
Patented July 5, 1966

3,259,219
VISCOUS COUPLING
Keith A. Boyd, Mount Clemens, Mich., assignor to Eaton Manufacturing Company, Cleveland, Ohio, a corporation of Ohio
Filed Oct. 14, 1963, Ser. No. 315,973
11 Claims. (Cl. 192—58)

The present invention relates to a drive coupling of the type embodying a fluid medium transmitting torque between relatively rotatable input and output coupling members, and particularly to a shear type fluid coupling wherein a viscous fluid shear medium, such as silicone fluid, transmits torque between the rotatable coupling members.

Prior art fluid couplings utilizing silicone fluid for transmitting torque between the relatively rotatable coupling members, have been subject to the problem of "speed fall-off" at high temperatures. More specifically, at high temperatures the speed of the output coupling member decreases. This problem is due to the tendency of the silicone fluid to decompose at high temperatures causing the viscosity of the fluid to decrease and thereby effecting a substantial reduction in the torque output. By venting the coupling and allowing oxygen to contact the silicone fluid at high temperatures, the fluid oxidizes causing the viscosity of the fluid to tend to rise. The oxidizing of the fluid to a certain extent overcomes the decomposing effect on the viscosity, and thus the viscosity of the fluid tends to maintain constant.

The principal object of the present invention is the provision of a new and improved fluid coupling having means for venting the fluid chamber of the coupling at approximately the temperature at which the viscous shear fluid tends to decompose so as to maintain the viscosity of the fluid substantially constant and maintain output speed relatively stable.

Another object of the present invention is the provision of a new and improved coupling having vent means for venting the fluid chamber so as to prevent a decrease in the torque transmitted to the output member of the coupling at high temperatures, and wherein the vent means is extremely simple in construction, highly reliable in operation, inexpensive, and easily manufactured.

A further object of the present invention is the provision of a new and improved fluid coupling having a vent means for venting the fluid chamber in the coupling to the atmosphere and including a passageway and means located in the passageway closing the passageway so that fluid in the chamber will not leak therefrom during handling and assembly of the coupling in the particular environment in which it is to be used and which is open to vent the fluid chamber through the passageway at high temperatures.

A further object of the present invention is the provision of a new and improved fluid coupling having a vent means for venting the fluid chamber of the coupling including a passageway connected with the fluid chamber and the atmosphere and having a mass or plug of fusible material located in the passageway closing or blocking fluid flow through the passageway, and which material melts or fuses at a predetermined temperature so as to open or unblock the passageway for venting purposes.

A further object of the present invention is the provision of a new and improved fluid coupling having vent means for venting the fluid chamber of the coupling at high temperatures including a vent passageway located in the drive shaft of the coupling and including a passageway blocking means supported by the drive shaft in the vent passageway and closing the passageway and operable to open the passageway at high temperatures and wherein the blocking means comprises a plug of fusible material which melts or fuses upon reaching a predetermined temperature to open the passageway so as to vent the fluid chamber to the atmosphere.

A further and more specific object of the present invention is the provision of a new and improved fluid coupling, as noted in the next preceding paragraph, wherein the fusible material is a plastic material, which if it contacts the shear fluid does not detrimentally affect it, and wherein the material is pressed into the vent passageway in the drive shaft and frictionally held therein.

Further objects and advantages of the present invention will be apparent to those skilled in the art to which it relates from the following detailed description of a preferred embodiment thereof made with reference to the accompanying drawings forming a part of this specification and in which, FIG. 1 is an axial sectional view of a fluid coupling embodying the present invention;

FIG. 2 is an enlarged fragmentary axial sectional view of a portion of the fluid coupling shown in FIG. 1;

FIG. 3 is a transverse sectional view taken along the section line 3—3 of FIG. 2; and FIGS. 4, 5 and 6 are axial sectional views of a portion of the fluid coupling shown in FIG. 1 under different operating conditions.

The present invention provides a new and improved fluid coupling of the type including relatively rotatable coupling members having a fluid shear space therebetween and which are cooperable with a fluid shear medium within the shear space to provide a shear type drive therebetween. Fluid couplings of this type may be used for driving various different kinds of load devices but have their primary use in driving engine accessories. The preferred embodiment of the present invention shown in the drawings and to be described hereinbelow illustrates a fluid coupling 10 functioning as a drive for a fan accessory device of an internal combustion engine, not shown. The fluid coupling device 10 includes an input coupling member 11, an output coupling member 12, and cooling fan blades 14 and 15 which are driven from the engine through the fluid coupling 10.

The fluid coupling 10 also includes an input shaft member 17 on which the input coupling member 11 is mounted and which is rotatable as by a belt drive including a pulley member 18, only a portion of which is shown in the drawings. The pulley member 18 is connected to the input shaft 17, at one end thereof, by suitable screws 19 which extend through flange portion 20 on the end of the shaft member 17 and through openings in the pulley member. The screws 19 are threaded into a hub plate 21 located on the side of the pulley 18 opposite from the flange portion 20 and are effective to clamp the pulley between the flange portion 20 and hub plate 21. The hub plate 21 has a central opening therethrough which communicates with an opening or passageway in the flange portion 20 which openings receive a stub shaft member 22 which is rotatably supported by the engine block and supports the coupling.

The input shaft member 17 has, intermediate its ends and adjacent the flange portion 20, an axially extending portion 23. The member 17 also has a reduced shaft portion 25 connected to the shaft portion 23 and functioning as a support for the inner race of a ball bearing assembly 30. Another shaft portion 31 is provided with surface serrations and a reduced diameter portion 32 connects the shaft portion 31 with a further shaft portion 33 at the end of the shaft 17 opposite the end having the flange portion 20.

The rotatable input or driving member 11 of the fluid coupling 10 is in the form of a disk having a hub portion 35 supported by the shaft 17. The hub portion 35 has an opening therethrough which has an interference fit with the shaft portions 31 and 33. The hub portion 35 is pressed onto the shaft 17 until the inner surface of the hub portion 35 abuts the side of the inner race of the ball bearing assembly 30, and thus prevents movement of the ball bearing assembly 30 to the left as viewed in FIG. 1. The outboard end of the shaft 17 is balled over or flared at 38 to positively retain the coupling member 11 on the shaft. The input member 11 further includes a radially extending portion 36 connected to the hub portion 35 and having a plurality of axially extending passageways 37 therein spaced circumferentially and for a purpose to be described hereinbelow. From the above description, it should be apparent that rotation of the shaft 17 causes the input coupling member 11 to be rotated.

The input coupling member 11 rotates in a fluid working or operating chamber 40 forming a part of a fluid chamber means 41 formed by the rotatable output or driven coupling member 12. The output coupling member 12 is in the form of a housing and includes a main housing member 42 having a hub portion 43 with an opening 44 therethrough. The opening 44 has an interference fit with the outer race of the ball bearing assembly 30 and is supported thereby for rotation about the axis of the shaft 17. A flange portion 45 engages the right side of the outer race of the ball bearing assembly 30 as viewed in FIG. 1 and restrains housing member 42 from movement in one axial direction. Preferably the outer race of the ball bearing assembly 30 is restrained from movement in the opposite axial direction by a rolled-over portion 46 of the housing member 42. The fan blades 14 and 15 are secured to surface portions 47 of the housing member 42 by stud and nut assemblies 48 so as to rotate with the housing member 42. The housing member 42 also includes a plurality of fin members 49 located on the outer surface of the housing member 42 and functioning to cool the coupling 10.

The working chamber 40 formed by the output member 12 is defined by a cylindrical surface 50 coaxial with the shaft 17 and by end surfaces 51 and 52. The cylindrical surface 50 is provided by a bore in the housing member 42 and the end surface 52 is located at the bottom of bore. The end surface 51 is provided by a partition member 53 in the form of a disk which extends transversely of the shaft 17 and the peripheral edge of which is secured to the housing member 42.

The input member 11 which rotates in the working chamber 40 has a surface portion spaced from the surface 52 of the housing member 42, which surfaces have a plurality of axially extending cooperating grooves and lands therein which are designated generally 56. These grooves and lands provide opposed surfaces extending in close parallel face to face relation and having an intervening shear space therebetween. Upon rotation of the disk 11 any fluid in the fluid operating chamber 40 transmits torque from the disk 11 to the housing member 42, and specifically silicone fluid in the above mentioned shear space transmits torque between the input and output members by the shear action of the fluid.

The amount of torque transmitted from the input member 11 to the output member 12 is a function of the volume and viscosity of the fluid in the chamber 40 and specifically in the above mentioned shear spaces. The fluid coupling 10 preferably includes a means for varying the volume of fluid in the shear spaces. Any conventional and known structural arrangement may be provided for varying the volume of the fluid and the specific structure involved will not be described herein in detail. It should suffice to say that the fluid chamber means 41 includes a reservoir chamber 58 communicating with the operating chamber 40 and means is provided for effecting fluid flow from the reservoir chamber to the operating chamber to increase the volume of fluid therein and from the operating chamber 40 to the reservoir chamber to decrease the volume of fluid therein. Reference is made to United States Patent No. 3,055,473 which shows a specific structure for transferring fluid between the reservoir chamber 58 and the working chamber 40 which structure may be incorporated herein.

During the transmission of torque between the relatively rotatable coupling members through the action of the silicone fluid as described above, heat is created and at high operating speeds and/or high atmospheric temperatures the silicone fluid used to transmit torque between the coupling members decomposes and the viscosity thereof decreases. By allowing oxygen to contact the silicone fluid at high temperatures the fluid is oxidized causing the viscosity of the fluid to rise. This minimizes speed fall-off or decrease in output torque. The fluid coupling 10 thus includes a vent means 60 for venting the fluid chamber means 41 at high temperatures so as to provide for contact of the oxygen in the ambient atmosphere with the fluid in the fluid chamber.

The vent means 60 includes a vent passageway 61 in the shaft member 17 and extending axially thereof and communicating at one end with the operating chamber 40 and at the other end with the atmosphere surrounding the coupling. The vent passageway 61 includes an enlarged passageway portion 62 communicating with the fluid chamber 40 centrally thereof and formed in the output end of the shaft 17. The enlarged portion of the vent passageway 62 communicates with a tapered portion 63 which connects the passage portion 62 with an axially extending passage portion 64 of reduced cross-sectional dimension. The passage portion 64 connects the tapered passage portion 63 with an enlarged plug receiving passage portion 65 which, in turn, communicates with an enlarged vent chamber 66 located in the portion 23 of the shaft 16. The chamber 66 communicates with the atmosphere surrounding the coupling and specifically with the atmosphere surrounding the shaft portion 23 by means of a plurality of radially extending vent openings 67 which extend radially through the portion 23 of the shaft 16 and communicate with the vent chamber 66 and the atmosphere surrounding the shaft portion 23. The chamber 66 also communicates with the passage in the flange portion 20 of the shaft 17 which receives the stub shaft member 22.

The vent passageway 61 is provided with a means 70 which blocks the flow of fluid through the passageway during the handling, shipping, and assembly of the coupling on the stud shaft member 22. The means 70 is operable to open or unblock the vent passageway 61 to thereby connect the fluid chamber 40 with the atmosphere after the fluid coupling has been assembled on the engine block. The means 70 in the preferred embodiment is responsive to high temperatures and opens the vent passageway 61 when the fluid coupling reaches a certain predetermined temperatures so as to provide for the oxygen in the atmosphere to contact the fluid in the chamber and thereby allow the coupling to "breathe."

The means 70 in the preferred embodiment comprises a suitable mass or plug of fusible material, preferably polyethylene, which is pressed in the plug receiving passage portion 65 and preferably into engagement with the plug seat 71 formed as a shoulder at the end of passage portion 65. The plug of material is frictionally held in passage portion 65 during handling and assembly of the fluid coupling and thus prevents fluid in the coupling from leaking or flowing therefrom through the vent passage 61 during handling and assembly on the stub shaft member. Preferably, the fusible material is a polyethylene plastic material which softens or melts as the temperature thereof increases and softens sufficiently when the fluid decomposes so as to open or unblock the passageway 61. During operation the drive shaft 17 is at a lower temperature than the temperature of the silicone fluid, and thus the fusible material must soften sufficiently at a temperature below that at which the fluid decomposes so as to open the passageway when the fluid has reached the temperature at which it decomposes and the drive shaft is at a lower temperature.

As the temperature of the fluid increases and approaches the temperature at which it begins to decompose, the fusible material in the vent passage portion 65 softens and tens to flow radially outwardly of passage portion 65, due to the centrifugal force acting on the material, and also tends to flow axially of the shaft member 17 due to the pressure built up in the fluid chamber 40 at high temperatures. This combination of pressures acting on the material causes the material to take a configuration shown in FIG. 4. As the temperature of the fusible material continues to increase, the material flows so as to cause the formation of a small hole through the center of the mass of the polyethylene material. As the temperature further increases the hole in the mass enlarges as shown in FIG. 5, and continues to enlarge until the mass of material forms a sleeve 70a on the inner diameter of the shaft 17 or walls thereof defining the vent passageway 61, as shown in FIG. 6.

When the fusible material is melted to unblock the vent passageway 61, the oxygen in the atmosphere contacts the fluid in the fluid chamber, as described above. It should be apparent that the atmosphere communicates with the fluid chamber through the now open vent passageway 61 and communicates with the opposite sides of the input member 11 through the provision of the axially extending passages or openings 37 therein. Thus the oxygen in the atmosphere contacts the fluid in the operating chamber on the opposite axial sides of the input member 11, and more specifically the oxygen in the atmosphere contacts the portion of the fluid located in the shear spaces between the lands and grooves generally designated 56 so as to oxidize the fluid in the shear spaces to increase the viscosity thereof as described hereinabove.

As the fusible material begins to soften, a small hole is formed therein as described hereinabove. If the coupling cools down after initial softening of the material and formation of the hole, the hole through the material will close due to the surface tension of the material. However, once the fusible material melts sufficiently, the fluid chamber 40 is continuously vented and the opening through the material will not close on cooling. Since the coupling is in an assembled condition when the chamber 40 is continuously vented, the problem of fluid leakage through the vent passageway 61 is minimized due to the centrifugal force on the fluid in the fluid chamber which maintains the fluid in the fluid chamber radially outwardly of the central portion thereof which communicates with the vent passageway 61. Moreover, when in a nonopening condition the fluid takes the position shown in FIG. 1 and is thus spaced radially outwardly of the vent passageway 61. Therefore, no substantial fluid flows through the vent passageway 61.

As the material 70 melts the pressure in the fluid chamber 40 tends to force the material axially of the vent passageway 61 as mentioned hereinabove. This pressure also tends to keep the material from flowing into the fluid chamber 40 and contacting the silicone fluid therein. Some contact of the material with the fluid, however, may occur, and the polyethylene material, if it contacts the fluid, will not react therewith and detrimentally affect the fluid. Materials other than polyethylene may be used for forming the means 70. However, the material used should be such that it will melt or soften at a temperature which is approximately the temperature of the drive shaft when the silicone fluid is at the temperature at which it decomposes. The material selected also should be such that it will not react with the silicone fluid in the fluid chamber in the event the material would contact the fluid. In this connection some materials may act as a catalyst and, upon contacting the fluid in the fluid chamber, may cause the fluid to decompose.

From the above description it should be readily apparent that the fluid coupling described above provides for venting the fluid chamber through the provision of a simple and highly reliable venting arrangement wherein the fluid chamber is vented through the shaft of the coupling and the fluid in the fluid chamber is prevented from flowing through the vent passageway during handling and shipping of the coupling by means of the novel construction. Moreover, as is well known, the fluid coupling is supported in the ram air stream so that the ram air engages the front portion of the coupling remote from the flange portion 20, and by locating the vent openings 67 on the back side of the coupling and away from the ram air stream, the amount of dirt entering the fluid chamber through the vent passageway is minimized without the need for a dirt shield.

While the preferred embodiment of the present invention has been describe hereinabove in considerable detail, it should be understood that certain changes, modifications and adaptations of the present invention may be made by those skilled in the art to which the invention relates and it is hereby intended to cover all such changes, adaptations and modifications coming within the scope of the appended claims.

Having described my invention, I claim:

1. A drive coupling comprising first and second relatively rotatable coupling members, said first coupling member defining a fluid chamber in which said second coupling member is rotatable, said first and second coupling members having opposed spaced parallel surfaces defining a fluid shear space therebetween and cooperable with a fluid shear medium in said shear space to provide a shear type fluid drive therebetween, vent means for venting said fluid chamber to the atmosphere surrounding said coupling and including a vent passageway communicating with said fluid chamber and with the atmosphere and a mass of fusible material located in said vent passageway and fusible at a predetermined temperature to open said vent passageway and connect said fluid chamber with the atmosphere surrounding said coupling.

2. A drive coupling comprising first and second relatively rotatable coupling members, said first coupling member defining a fluid chamber in which said second coupling member is rotatable, said first and second coupling members having opposed spaced parallel surfaces defining a fluid shear space therebetween and cooperable with a fluid shear medium in said shear space to provide a shear type fluid drive therebetween, vent means for venting said shear space to the atmosphere surrounding said coupling and including a vent passageway communicating with said shear space and with the atmosphere and a mass of fusible material located in said vent passageway and fusible at a predetermined temperature to open said vent passageway and connect said shear space with the atmosphere surrounding said coupling.

3. A drive coupling comprising a first coupling member defining a fluid operative chamber, a second coupling member rotatable relative to said first coupling member in said fluid chamber, a shaft member operatively connected to said second coupling member for rotating said coupling member upon rotation of said shaft member, and vent means for venting said fluid operating chamber to the atmosphere surrounding said fluid coupling and including a vent passageway in said drive shaft member and extending axially thereof and communicating with said fluid operating chamber and with the atmosphere, and means located in said vent passageway and blocking flow of fluid through said vent passageway and operable to open said vent passageway at a predetermined temperature.

4. A fluid coupling comprising a first coupling member defining a fluid chamber, a second coupling member rotatable in said fluid chamber, said first and second coupling members having opposed parallel surfaces forming a shear space therebetween and cooperable with a fluid shear medium in said shear space to transmit torque between the coupling members, a drive shaft operatively connected to said second coupling member to rotate said second coupling member to said fluid chamber upon rotation of said drive shaft, an axially extending vent passageway located in said drive shaft and communicating with said fluid chamber and the atmosphere surrounding said drive shaft, and a mass of fusible material located in said vent passageway and blocking fluid communication between said chamber and the atmosphere through said vent passageway and fusible at a predetermined temperature to open said vent passageway and connect said fluid chamber with the atmosphere.

5. A fluid coupling as defined in claim 4 wherein said vent passageway includes a plug receiving passage portion and said fusible material comprises a mass of plastic material frictionally held in said plug receiving passage portion.

6. A fluid coupling as defined in claim 4 wherein said vent passageway includes an enlarged vent chamber and radially extending vent passageway portions connected with said vent chamber and the atmosphere surrounding said shaft.

7. A fluid coupling as defined in claim 4 wherein said mass of fusible material comprises a polyethylene plastic plug member pressed into a portion of said vent passage.

8. A fluid coupling as defined in claim 4 wherein said fusible material forms a sleeve engaging wall portions of said drive shaft which define said vent passageway and extending axially of said vent passageway at a predetermined temperature.

9. A fluid coupling comprising a first coupling member defining a fluid chamber, a second coupling member rotatable in said fluid chamber, said first and second coupling members having opposed parallel surfaces defining shear spaces therebetween and cooperable with a fluid shear medium in said shear spaces to transmit torque between said coupling members, a drive shaft member operatively connected to said second coupling member for rotating said second coupling member upon rotation of said drive shaft, said drive shaft including a bearing supporting portion, a bearing assembly encircling said shaft and engaging said bearing supporting portion of said drive shaft and said first coupling member for supporting said first coupling member for rotation relative to said drive shaft, an axially extending vent passageway in said drive shaft and communicating at one end with the operating chamber and extending through said bearing shaft supporting portion and communicating at its other end with the atmosphere on the side of said bearing shaft supporting portion opposite the side on which said fluid chamber is located, and a mass of fusible material located in said vent passageway blocking the flow of fluid therethrough and fusible at a predetermined temperature to provide for the flow of fluid through said vent passageway.

10. A drive coupling to be supported by a support member comprising first and second relatively rotatable coupling members, said first coupling member defining a fluid chamber in which said second coupling member is rotatable, said first and second coupling members having opposed spaced parallel surfaces defining a fluid shear space therebetween and cooperable with a fluid shear medium in said shear space to provide a shear type fluid drive therebetween, vent means for venting said shear space to the atmosphere surrounding said coupling and including a vent passageway communicating with said shear space and with the atmosphere, and a mass of fusible material located in said vent passageway and held therein so as to block flow of fluid through said vent passageway during handling of the coupling and during assembly with said support member and fusible at a predetermined temperature to open said vent passageway and connect said shear space with the atmosphere surrounding said coupling during the transmission of torque between said coupling members.

11. A fluid coupling comprising a first coupling member defining a fluid chamber, a second coupling member rotatable in said fluid chamber and dividing said fluid chamber so as to provide a first chamber portion located on one axial side thereof and a second chamber portion located on the opposite axial side thereof, said second coupling member having axially extending passages communicating said first and second chamber portions, said first and second coupling members having opposed parallel surfaces forming a shear space therebetween in said second chamber portion and cooperable with a fluid shear medium in said shear space to transmit torque between the coupling members, a drive shaft operatively connected to said second coupling member to rotate said second coupling member in said fluid chamber upon rotation of said drive shaft, an axially extending vent passageway located in said drive shaft and communicating with said first chamber portion and with the atmosphere surrounding said drive shaft, and a mass of fusible material located in said vent passageway and blocking flow of fluid through said vent passageway and fusible at a predetermined temperature to open said vent passageway and connect said first fluid chamber portion with the atmosphere.

References Cited by the Examiner

UNITED STATES PATENTS 3,193,068    7/1965    Greve et al. _____ 192—82
3,194,372    7/1965    Weir _____ 192—58

DAVID J. WILLIAMOWSKY, *Primary Examiner.*

DON A. WAITE, *Examiner.*

A. T. McKEON, *Assistant Examiner.*